J. H. Miller.
Animal-Trap.
№ 73625.  Patented Jan. 21, 1868.
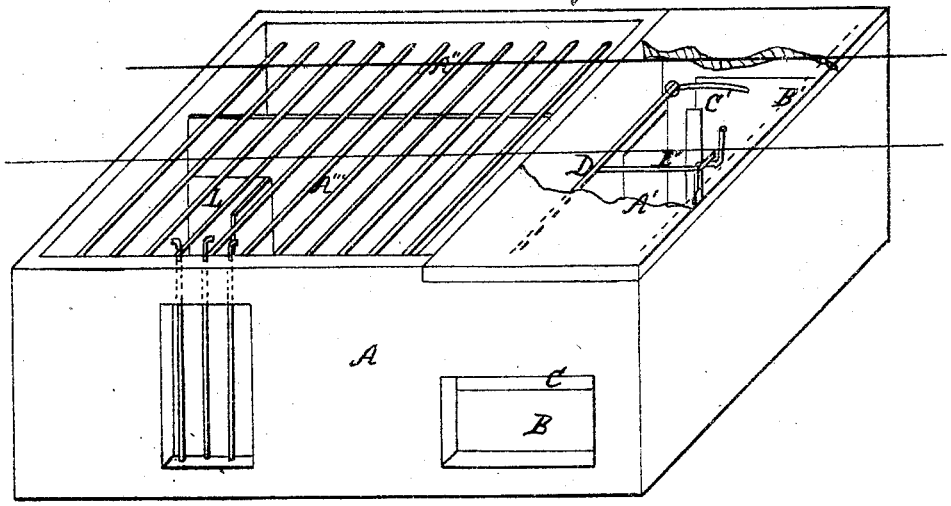
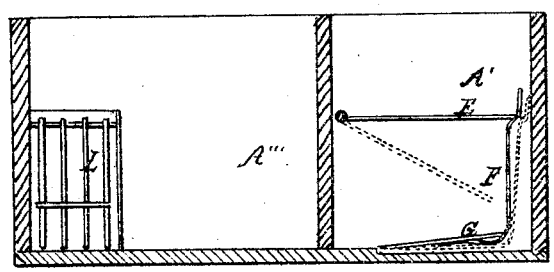
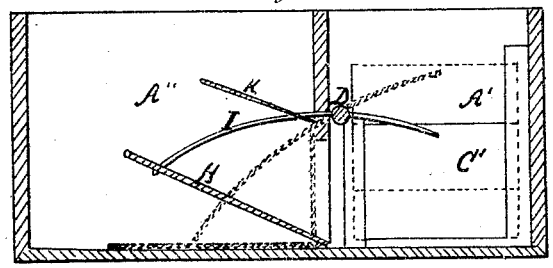
Witnesses.
Chas F. Clausen
E. H. Sprague
Inventor.
John H. Miller
by
D. P. Holloway & Co
his attys

United States Patent Office.

JOHN H. MILLER, OF VERNON, INDIANA.

Letters Patent No. 73,625, dated January 21, 1868.

---

IMPROVED ANIMAL-TRAP.

---

The Schedule referred to in these Letters Patent and making part of the same.

---

TO ALL WHOM IT MAY CONCERN:

Be it known that I, JOHN H. MILLER, of Vernon, in the county of Jennings, and State of Indiana, have invented a new and useful Improvement in Animal-Traps; and I do hereby declare that the following is a full, clear, and exact description of the same, reference being had to the annexed drawings, making part of this specification, in which—

Figure 1 is a perspective view.

Figure 2, a vertical section on the line $x\ x$.

Figure 3 is a vertical section on the line $y\ y$.

The same letters are employed in all the figures in the designation of parts which are identical.

This invention consists in a novel arrangement of the parts of an animal-trap, as set forth in the following description and claims.

A is the external case, which is subdivided by partitions into three compartments, $A^1\ A^2\ A^3$. The former is tightly covered; the two latter ones are covered by a grating. The animal gains ingress to the compartment $A^1$ from the outside, through doors B and B', in the ends. These openings may be closed by the sliding doors C C', which slide up and down in cleats attached to the case. The doors are suspended from arms extending from the oscillating shaft D, which turns in bearings on the ends of the case. From this shaft an arm, E, projects, bent at right angles horizontally at the end. It is suspended, when the trap is set, by a trigger, F, which is a spring bent as shown in fig. 2. The platform G, on which the bait is placed, rests on that part of the trigger F which is carried along the floor. When the animal entering the trap, enticed by the bait, steps upon the platform G, its weight disengages the arm E by pushing back the trigger F, allowing the shaft to turn, and the gates C C to fall by their own gravity, preventing the escape of the animal through the openings B B'. There is an opening through the partition from the compartment $A^1$ into $A^2$. In the latter is a platform, H, hinged at the end nearest the opening, which is connected by the bent rod I with the gate C', the rod I passing through the shaft D, and extended into the compartment $A^1$, forming the arm by which the gate C' is suspended. The opening between the compartments is closed, when the trap is set, by a door, K, swinging upwards. This door has a projection from its side, which rests upon the rod I, so that when the gate C falls, the rod I will raise the platform H from the position shown in red lines in fig. 2 to the inclined position shown in black lines in the same figure, at the same time raising the door K from the position shown in red lines to the one shown in black lines, thereby opening the communication from compartment $A^1$ to $A^2$. The animal, seeking to escape, and attracted by the light in compartment $A^2$, will enter, and its weight will cause the platform H to descend, thereby drawing down the rod I, and permitting the door K to fall. This motion of rod I will turn the shaft D and raise the doors C and C'. The trigger engaging the arm E, the trap will be again set, the animal being a prisoner in compartment $A^2$. From this compartment it can escape into $A^3$ through an opening covered by the inclined grated door L, which will permit the animal to pass into $A^3$, and falling behind it, prevent its return into $A^2$.

What I claim as my invention, and desire to secure by Letters Patent, is—

An animal-trap, constructed with a case, A, subdivided into compartments with openings closed by doors C C', K, and L, which are actuated by means of the platforms G and H, trigger F, shaft D, and arms E and I, arranged to operate substantially as set forth.

In testimony whereof, I have signed my name to this specification, in the presence of two subscribing witnesses.

JOHN H. MILLER.

Witnesses:
 HENRY C. BRUNER,
 NICOLAS MARCHIN.